United States Patent Office.

JOSEPH A. JONES, OF BALTIMORE, MARYLAND, ASSIGNOR TO HIMSELF AND JOHN DONALDSON, OF SAME PLACE.

Letters Patent No. 82,529, dated September 29, 1868.

IMPROVED ROOFING-COMPOUND.

The Schedule referred to in these Letters Patent and making part of the same.

TO ALL WHOM IT MAY CONCERN:

Be it known that I, JOSEPH A. JONES, of Baltimore, in the county of Baltimore, and in the State of Maryland, have invented certain new and useful Improvements in Roofing-Compound; and do hereby declare that the following is a full, clear, and exact description thereof.

My invention consists of the following ingredients: Coal-tar, two and a half gallons; paraffine varnish, one and a half gallon; pulverized iron ore, sixty pounds; ground slate, fifty pounds; which are mixed together and spread on the roof of a building. It soon hardens, and becomes impervious to rain, snow, &c., and will last longer than any other roofing-compound now in use.

I do not, however, confine myself to the exact proportions or ingredients above mentioned, but may vary them to suit different climates and circumstances.

Having thus fully described my invention, what I claim as new, and desire to secure by Letters Patent, is—

A compound, consisting of the ingredients mentioned, and applied to roofs, substantially as and for the purposes herein set forth.

In testimony that I claim the foregoing, I have hereunto set my hand, this 23d day of June, 1868.

J. A. JONES.

Witnesses:
A. N. MARR,
LEOPOLD EVERT.